United States Patent [19]

Kobayashi et al.

[11] Patent Number: 4,840,873
[45] Date of Patent: Jun. 20, 1989

[54] PRODUCTION OF OPTICAL RECORDING MEDIUM

[75] Inventors: Hideki Kobayashi; Minoru Ikeda, both of Kurashiki; Koichi Saito, Okayama; Shiro Nagata; Koichi Horino, both of Kurashiki, all of Japan

[73] Assignees: Kuraray Co., Ltd., Kurashiki; Kuraray Plasmon Data Systems Co., Ltd., Osaka, both of Japan

[21] Appl. No.: 72,139

[22] Filed: Jul. 10, 1987

[30] Foreign Application Priority Data

Jul. 11, 1986 [JP] Japan ................... 61-164276

[51] Int. Cl.⁴ ............ G03C 1/72; G03C 1/94
[52] U.S. Cl. .................... 430/273; 430/270; 430/275; 430/277; 430/278; 430/945; 430/327; 430/330; 346/135.1; 264/235; 264/346
[58] Field of Search ............ 430/275, 270, 290, 273, 430/495, 945, 327, 330, 964, 277, 278; 346/135.1; 264/346, 235

[56] References Cited

U.S. PATENT DOCUMENTS

| 3,452,133 | 6/1969 | Bratton et al. | 264/346 |
| 3,454,445 | 7/1969 | Durst et al. | 264/346 |
| 4,365,257 | 12/1982 | Gerfast | 346/135.1 |
| 4,539,572 | 9/1985 | Robbins et al. | 430/945 |
| 4,583,102 | 4/1986 | Tamura et al. | 430/945 |
| 4,601,861 | 7/1986 | Pricone | 425/71 |
| 4,616,237 | 10/1986 | Pettigrew et al. | 430/508 |
| 4,729,805 | 3/1988 | Alexander et al. | 264/235 |

FOREIGN PATENT DOCUMENTS

| 0074834 | 5/1982 | Japan | 430/945 |
| 8151222 | 9/1983 | Japan . | |
| 0210493 | 10/1985 | Japan | 430/290 |
| 1020719 | 1/1986 | Japan . | |
| 1079626 | 4/1986 | Japan . | |

OTHER PUBLICATIONS

Polymer Handbook, 2nd Ed., Brandrup et al., pp. III-159-III-160.

Primary Examiner—Paul R. Michl
Assistant Examiner—Lee C. Wright
Attorney, Agent, or Firm—Oblon, Spivak, McClelland, Maier & Neustadt

[57] ABSTRACT

A process for producing an optical recording medium, comprising heat-treating an optical recording medium formed of a thin metal film on the minutely roughened surface of a plastic substrate, the medium being capable of strongly absorbing laser light of a specific wavelength region thereby being able to be written upon.

18 Claims, 1 Drawing Sheet

PRODUCTION OF OPTICAL RECORDING MEDIUM

BACKGROUND OF THE INVENTION

1. Field of the Invention

The present invention relates to a process for producing an optical recording medium to record and read information by means of a laser beam. More particularly, the present invention relates to a process for producing an optical recording medium which possesses superior recording sensitivity and recording stability and is made up of a plastic substrate formed by injection molding, injection-compression molding, compression molding, or a photopolymer process and a thin metal film formed on the substrate.

2. Description of the Background

Optical recording media which record and read information by means of a laser beam are rapidly becoming practical because of recent developments in the fundamental technology of semiconductor lasers, recording materials, and film making processes and also because of the ability of the recording media to record a large amount of information. For optical recording media to be able to record information, a phase change which leads to an optical change should take place in the portions of given medium struck with a laser beam. Bubble making, pitting, and amorphous statecrystalline state transfer are some of the recording methods which have been proposed so far.

One optical recording medium which is known is formed of a plastic substrate, which has a minutely roughened surface structure and a thin metal film formed on its surface. Another optical recording medium which is known is made up of a plastic substrate which have a smooth surface and a thin metal film formed on the substrate. The advantage of the former medium is that recording is possible with low power, because the recording laser beam is absorbed efficiently by the medium. This optical recording medium is disclosed in U.S. Pat. No. 4,616,237.

There still is a demand for a long-life laser source, as well as a demand for a medium which has increase recording capacity. In order to meet this demand, an optical recording medium should be able to record information at a higher speed with a laser beam of lower power. In other words, the optical recording medium should have a higher sensitivity.

Optical recording media normally have a substrate made of glass or plastic. In comparison to glass substrates, plastic substrates are lighter in weight, easier to mold, unbreakable, and more suitable for high-speed recording. On the other hand, plastic substrates have the disadvantage that they are liable to deform because of residual stress imparted at the time of molding of the substrate. Therefore, plastic substrates are not absolutely reliable for use in the manufacture of writable recording media and erasable-rewritable recording media which require long-term reliability and durability. Efforts to eliminate this disadvantage are being made. For example, a heat treatment process is known which removes residual stress as disclosed in, for example, Japanese Patent Laid-Open Nos. 151222/1983, 20719/1986, and 79626/1986.

SUMMARY OF THE INVENTION

Accordingly, one object of the present invention is to provide a process for producing an optical recording medium which has superior recording sensitivity and recording stability.

The gist of the present invention resides in a process for producing an optical recording medium, said process comprising heat-treating an optical recording medium made up of a plastic substrate having a surface of minutely roughened structure and a thin metal film formed on the surface. The medium is capable of strongly absorbing laser light of a specific wavelength region, which allows the writing of data thereon.

Briefly, this object and other objects of the present invention as hereinafter will become more readily apparent can be attained by an optical recording medium which is made of a plastic substrate which has a minutely roughened surface structure and a thin metal film formed on the surface thereof, said medium being heat-treated at a temperature within a range which is lower by 80° C. and higher by 60° C. than the glass transition point of the material of the plastic substrate. The heat-treated recording medium obtained possesses superior recording sensitivity and recording stability.

BRIEF DESCRIPTION OF THE DRAWINGS

A more complete appreciation of the invention and many of the attendant advantages thereof will be readily obtained as the same becomes better understood by reference to the following detailed description when considered in connection wtih the accompanying drawing, wherein:

The FIG. 1 is a diagram which shows the relationship between the recording laser power and the CNR measured in Example 4 and Comparative Example A of the specification.

DETAILED DESCRIPTION OF THE PREFERRED EMBODIMENTS

Figure 1:
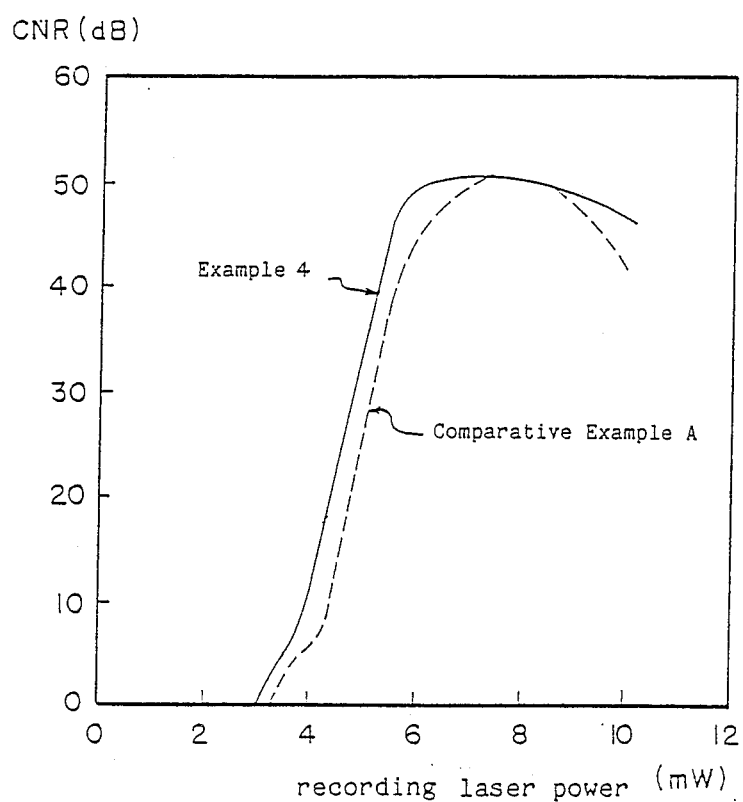

The recording medium of the present invention is formed of a plastic substrate which has a minutely roughened surface structure and a thin metal film formed thereon. This basic structure can be obtained by the process described in, for example, U.S. Pat. No. 4,616,237.

The substrate may be produced from any plastic which undergoes thermal decomposition or heat distortion on portions thereof which are struck with recording laser light. Examples of such plastics include polymethyl methacrylate (PMMA) and copolymers thereof, polycarbonates (PC), polyesters, polyolefins, and polyamides which have good transparency.

The laser source is not specifically limited, but a semiconductor laser is preferred to make the drive unit compact. The wavelength of the laser is preferably 750–850 nm. The power for the recording laser is preferably 1–10 mW.

The minutely roughened structure on the surface of the plastic substrate can be easily produced by injection molding, injection-compression molding, or compression molding plastic material in a mold having its inner surface minutely roughened. The plastic substrate can also be produced by a photopolymer (2P) process.

The minutely roughened surface structure strongly absorbs laser light of a prescribed wavelength region, thereby facilitating the writing of information on the recording medium with a laser beam. The roughened structure should preferably be such that the regular pitch measured in the direction parallel to the average surface level is smaller than the wavelength of the laser light for writing and reading. The depth normally is 0.05 to 1 μm. If the pitch in the horizontal direction is greater than the wavelength of the laser light or if the depth is less than 0.05 μm, the substrate is very much like a smooth surface substrate and needs the recording power of a smooth surface substrate. In other words, such a substrate does not have the recording properties of the roughened structure of the present recording medium. On the other hand, if the depth of the roughened surface is greater than 1 μm, the substrate efficiently absorbs the recording laser light but has the disadvantage that it cannot be produced in a short time with good reproducibility.

The thin metal film should preferably be produced from a metal which has a melting point higher than 400° C. Metals which have a melting point lower than 400° C. have the advantage that recording is possible with a recording laser of lower power, but the advantage is offset by the disadvantage that the range of recording power is narrow, the metal film cracks, and the bubbles on the metal film are deformed during storage. The upper limit of the melting point is not critical. However, metals with an excessively high melting point require a high power recording laser and detract from the features of the roughened surface structure. Metals which have a melting point of about 2000° C. are preferred. Suitable metals include platinum, gold, aluminum, chromium, titanium, iron, nickel, silver, copper, and the like, and alloys thereof. The thin metal film should preferably be 5-200 μm thick. Excessively thin films lack strength and crack at the time of recording. On the other hand, excessively thick films require a high power recording laser and detract from the features of the roughened surface structure.

The thin metal film may be formed in the usual way such as by sputtering, vacuum deposition, and ion plating. The process for forming the thin metal film is not limited to any specific process.

The present optical recording medium which has a plastic substrate and a thin metal film formed thereon should preferably reflect 5-60% of the incident laser light entering through the plastic substrate when a recording has not yet been made. If the reflectivity is less than 5%, stable tracking can not be performed for writing and reading operations. Conversely, with a reflectivity higher than 60%, the recording medium does not absorb laser light in the recording operation, in which case recording is impossible or a high power is required for recording.

The heat treatment step of the present invention is performed on the recording medium per se. This heat treatment is different in purpose, process, and effect from the one disclosed in the above-mentioned Laid Open Japanese Patent Application Nos. 151222/1983, 20719/1986, and 79626/1986, where the treatment is performed on the plastic substrate which is not yet provided with a thin metal film. If the substrate is heat-treated before the roughened surface is covered with the thin metal film, the effect intended by the invention is not produced.

According to the process of the present invention, the heat treatment should be performed in such a manner that the optical recording medium is not deformed. The requirement is met if the optical recording medium is placed on a flat board, while the heat treatment is conducted. The heat treatment may be carried out with the peripheral and central portions of the optical recording medium fixed or left free.

The heat treatment temperature is not specifically limited. Usually, it is a temperature which is higher than normal temperature for heat treatment. The desired effect is produced when the optical recording medium is allowed to stand at a temperature higher than 40° C. for a long time. The preferred heat treatment temperature is within a range where the lower end is lower by 80° C. than the glass transition point (Tg) of the material of the plastic substrate and with the upper end higher by 60° C. than the glass transition point (Tg) of the material of the plastic substrate. The more preferred temperature range is such that the lower end is lower by 20° C. than the Tg and the upper end is higher by 60° C. than the Tg. The most preferred temperature range is such that the lower end is lower by 20° C. than the Tg and the upper end is higher by 40° C. than the Tg. If the heat treatment temperature is lower than the specificed limit, it will take a long time for the heat treatment to produce the desired effect. The prolonged heat treatment deteriorates and yellows the plastic substrate. On the other hand, if the heat treatment temperature is higher than the specified limited, the minutely roughened surface structure will be broken and the optical recording medium will be deformed.

The duration of heat treatment is not specifically limited. It is properly selected depending on the heat treatment temperature. It is industrially preferable to make a selection so that the desired effect is produced when the heat treatment is performed for about 1-60 minutes.

The heat treatment may be performed in the air or in an inert gas atmosphere. The heat treatment effect may be promoted performing the same in an atmosphere of appropriate humidity. An effective heat treatment is performed at high humidity within limits which do not result in deformation of the medium.

It is not yet known how the effect of the heat treatment is produced. It is believed that the heat treatment brings about a change in some mutual interaction between the plastic substrate, which has the minutely roughened surface structure, and the thin metal film, in view of the fact that the desired effect is not produced simply by heat-treating the plastic substrate which is not yet provided with the thin metal film, and because it is impossible for the heat treatment at the low temperature of the present invention to compact the metal film and remove its residual stress.

Having generally described this invention, a further understanding can be obtained by reference to certain specific examples which are provided herein for purposes of illustration only and are not intended to be limiting unless otherwise specified.

EXAMPLES 1 TO 6 AND COMPARATIVE EXAMPLE A

A polycarbonate disc (substrate) having an inside diameter of 15 mm, an outside diameter of 130 mm, and a thickness of 1.2 mm was made by injection molding. The disc had a minutely roughened surface structure (sinusoidal wave) with a regular pitch of 0.3 μm, measured in the direction parallel to the average surface level, and a depth of 0.1 μm. The disc had a glass transition point of 140° C. as measured by the DSC (differential scanning calorimeter) method. The disc was coated with a 15 nm thick platinum film by sputtering, and an optical recording medium was obtained. It had a reflectivity of 18%, which is satisfactory for control of focussing and tracking with a laser beam having a wavelength of 830 nm.

The optical recording medium was heat-treated at various temperatures for various periods, as shown in Table 1, on a flat glass plate in a constant temperature air bath. After the heat-treated optical recording medium was allowed to cool to 20° C., recording was performed with a semiconductor laser having a wavelength of 830 nm. During the recording procedure, the laser power was gradually changed from 1 mW to 10 mW and the CNR was measured to compare the recording sensitivity.

The heat-treated optical recording medium was placed in a thermohygrostat at 40° C. and 95% relative humidity (RH) for 1000 hours. Recording was performed with a semiconductor laser having a wavelength of 830 nm, in the same manner as mentioned above. The laser power was 8 mW. The CNR was compared with that measured before aging to evaluate the recording stability.

In Comparative Example A, the same procedure as described above was repeated except that the heat treatment was not performed. The results are shown in Table 1 and FIG. 1. It is noted that the optical recording medium according to the invention is capable of recording with a low power, which indicates that it has a high sensitivity. It is also noted that the optical recording medium undergoes very little or no change in CNR after exposure to high humidity, which indicates that it is superior in recording stability. By contrast, in Comparative Example A, in which no heat treatment was performed, the CNR decreased to 5 dB (impractically low) after exposure of the medium to high humidity.

TABLE 1

| Example No. | Heat treatment temperature (°C.) | Heat treatment period (minutes) | CNR of recording before exposure (dB) | CNR of recording after exposure (dB) |
| --- | --- | --- | --- | --- |
| 1 | 100 | 120 | 50 | 47 |
| 2 | 120 | 120 | 50 | 49 |
| 3 | 135 | 60 | 50 | 50 |
| 4 | 140 | 15 | 50 | 50 |
| 5 | 160 | 10 | 50 | 50 |
| 6 | 180 | 5 | 50 | 50 |
| Comparative Example A | — | — | 50 | 45 |

After recording, the optical recording medium was aged in a thermohygrostat at 40° C. and 95% RH and the CNR of reading was measured. No decrease in CNR was observed. This result indicates that the optical recording medium of the invention remains stable after recording.

EXAMPLES 7 AND 8 AND COMPARATIVE EXAMPLES B TO D

Optical recording media were prepared in the same manner as described in Example 1 and heat-treated at 140° C. for various periods of time. In the Comparative Examples, the plastic substrate was heat-treated before the metal film was formed and the completed optical recording medium was not heat-treated. Recording was performed with a power of 8 mW and CNR was measured before and after the exposure to high humidity. The results are shown in Table 2. It is noted that stable recording is accomplished in the Examples, whereas this effect is not produced and the CNR is impractically low in the Comparative Examples in which the plastic substrate alone is heat-treated.

TABLE 2

| | Heat treatment of disc alone | | Heat treatment of disc & film | | CNR during recording before exposure (dB) | CNR during recording after exposure (dB) |
| --- | --- | --- | --- | --- | --- | --- |
| Example No. | Heat treatment temp. (°C.) | Heat treatment period (min) | Heat treatment temp. (°C.) | Heat treatment period (min) | | |
| 7 | — | — | 140 | 10 | 50 | 50 |
| 4 | — | — | 140 | 15 | 50 | 50 |
| 8 | — | — | 140 | 30 | 50 | 50 |
| B* | 140 | 10 | — | — | 50 | 45 |
| C* | 140 | 15 | — | — | 50 | 45 |
| D* | 140 | 30 | — | — | 50 | 45 |

*Comparative Examples

EXAMPLE 9

An optical recording medium was prepared by vacuum-depositing a 15 nm thick platinum film on the same polycarbonate disc obtained as described in Example 1. The optical recording medium was heat-treated at 140° C. for 15 minutes, and CNR was measured before and after exposure to high humidity. No change in CNR was observed. This result indicates that the effect of the invention is produced even when thin metal film is formed by a different process.

EXAMPLE 10 AND COMPARATIVE EXAMPLE E

A polymethyl methacrylate disc (substrate) having an inside diameter of 15 mm, an outside diameter of 130 mm, and a thickness of 1.2 mm was made by injection molding. The disc had a minutely roughened surface structure with a regular pitch of 0.3 μm as measured in the direction parallel to the average surface level and a depth of 0.1 μm. The disc had a glass transition point of 100° C. The disc was coated with a 12 nm thick platinum film by vacuum deposition and an optical recording medium was obtained. It had a reflectivity of 15% which permits satisfactory control of focussing and tracking.

The optical recording medium was heat-treated at 100° C. for 5 minutes (Example 10). The heat treatment was not performed in Comparative Example E. The optical recording medium was exposed to high humidity, as mentioned above, and the CNR was measured before and after exposure. In Example 10, CNR during recording decreased by about 3 dB after exposure, whereas in Comparative Example E, the CNR during recording decreased by more than 5 dB to an impractically low level. These results demonstrate the effect of the invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the united states is:

1. A process for producing an optical recording medium, which comprises:
    laminating a thin metal film ranging in thickness from 5 to 200 nm onto the minutely toughened surface of a plastic substrate; and
    heat-treating said laminated structure at a temperature which is greater than 40° C. and which at the same time is a temperature within the range of a temperature 80° C. lower than the glass transition temperature of the plastic substrate to a temperature 60° C. higher than the glass transition temperature of the plastic substrate; said optical recording medium upon exposure to laser light of a specific wavelength region, being deformed by the formation of bubbles on the thin metal layer of the recording medium which provide for the recording of information.

2. The process for producing an optical recording medium as claims in claim 1, wherein said heat treating is conducted for not less than 1 minute and not more than 120 minutes.

3. The process for producing an optical recording medium as claimed in claim 2, wherein the heat treatment is performed at a temperature higher than 40° C. and within a range where the lower end is lower by 20° C. than the glass transition point of the plastic substrate and the upper end is higher by 60° C. than the glass transition point of the plastic substrate.

4. The process for producing an optical recording medium as claimed in claim 3, wherein the heat treatment is performed at a temperature higher than 40° C. and within a range where the lower end is lower by 20° C. than the glass transition point of the plastic substrate and the upper end is higher by 40° C. than the glass transition point of the plastic substrate.

5. The process for producing an optical recording medium as claimed in claim 4, wherein the heat treatment is performed at high humidity.

6. The process for producing an optical recording medium as claimed in claim 4, wherein the heat treatment is performed on a flat plate.

7. The process for producing an optical recording medium as claimed in claim 23, wherein the plastic substrate has such a regularly roughened surface structure that the regular pitch, measured in the direction parallel to the average surface level, is smaller than the wavelength of the laser light used for writing and reading, and the depth is 0.05 to 1 μm.

8. The process for producing an optical recording medium as claimed in claim 23, wherein the thin metal film is produced from a metal having a melting point higher than 400° C.

9. The process for producing an optical recording medium as claimed in claim 8, wherein the thin metal film is produced from platinum, gold, aluminum, chromium, titanium, iron, nickel, silver, or copper, or an alloy thereof.

10. The process for producing an optical recording medium as claimed in claim 1, wherein the optical recording medium, before writing, has a reflectivity of 5 to 60% when it is struck with laser light through the plastic substrate.

11. The process for producing an optical recording medium as claimed in claim 1, wherein the minutely roughened structure on the substrate surface is formed by injection molding a plastic material.

12. The process for producing an optical recording medium as claimed in claim 1, wherein the minutely roughened structure on the substrate surface is formed by injection compression molding a plastic material.

13. The process for producing an optical recording medium as claimed in claim 1, wherein the minutely roughened structure on the substrate surface is formed by compression molding a plastic material.

14. The process for producing an optical recording medium as claimed in claim 1, wherein the minutely roughened structure on the substrate surface is formed by the photopolymer (2P) process.

15. The process for producing an optical recording medium as claimed in claim 1, wherein the metal layer is protected with a protective layer.

16. The process for producing an optical recording medium as claimed in claim 1, wherein the plastic material of the substrate is a thermoplastic resin.

17. The process for producing an optical recording medium as claimed in claim 16, wherein the thermoplastic resin is a polyester resin, a polyolefin resin, a polyamide resin, a polycarbonate resin, or a polymethacrylate resin.

18. A process for making permanent recordings on the optical recording medium of claim 1, which comprises: causing a semiconductor laser beam to strike the plastic substrate, thereby inducing the local decomposition of the plastic substrate which causes gas evolution that forms bubbles which have increased reflectivity.

* * * * *